United States Patent [19]

Yamaguchi

[11] Patent Number: 5,068,521
[45] Date of Patent: Nov. 26, 1991

[54] NON-CONTACT IC CARD

[75] Inventor: Atsuo Yamaguchi, Itami, Japan

[73] Assignee: Mitsubishi Denki Kabushiki Kaisha, Japan

[21] Appl. No.: 394,479

[22] Filed: Aug. 16, 1989

[30] Foreign Application Priority Data

May 18, 1989 [JP] Japan .................................. 1-122787

[51] Int. Cl.⁵ .............................................. G06K 7/10
[52] U.S. Cl. .................................... 235/492; 235/380; 235/436
[58] Field of Search .................. 235/379, 80, 487, 488, 235/492, 436

[56] References Cited

U.S. PATENT DOCUMENTS

| 4,791,285 | 12/1988 | Ohki | 235/492 X |
| 4,794,236 | 12/1988 | Kawana et al. | 235/492 X |
| 4,818,855 | 4/1989 | Mongeon et al. | 235/449 X |
| 4,899,036 | 2/1990 | McCrindle et al. | 235/492 X |
| 4,939,353 | 7/1990 | Iijima | 235/492 X |

FOREIGN PATENT DOCUMENTS 63-51194 3/1988 Japan .
63-284692 11/1988 Japan .

Primary Examiner—Stuart S. Levy
Assistant Examiner—Steven M. duBois
Attorney, Agent, or Firm—Leydig, Voit & Mayer

[57] ABSTRACT

A non-contact IC card includes a data transmission/reception circuit for data exchange between the IC card and an external device; a data processor connected to the data transmission/reception circuit; a reset signal receiving circuit for receiving a reset signal from the external device and an initializing circuit for initializing the data processor on the basis of the reset signal received by the reset signal receiving circuit.

9 Claims, 4 Drawing Sheets

NON-CONTACT IC CARD

BACKGROUND OF THE INVENTION

1. Field of the Invention

This invention relates to a non-contact IC card and, more particularly, to initialization of a data processing means incorporated in the IC card.

2. Description of the Related Art

FIG. 4 shows the structure of a conventional non-contact IC card which has an IC chip 5, a data transmitting antenna 6, a data receiving antenna 7, a battery 8 and an oscillator 9. A CPU 1 is formed on the IC chip 5. A ROM 2a, a RAM 2b, a data modulation circuit 3 and a data demodulation circuit 4, each of which is connected to the CPU 1, are also formed on the IC chip 5. The data transmitting antenna 6 and the data receiving antenna 7 are connected to the modulation circuit 3 and the demodulation circuit 4, respectively. The battery 8 and the oscillator 9 are connected to the CPU 1. The whole of the IC card is molded with a resin or the like to improve its resistance to environmental influences.

The CPU 1 is supplied with a power source voltage from the battery 8 and is also supplied with a clock signal from the oscillator 9. The CPU thereby operates on the basis of a program previously stored in the ROM 2a. This IC card is designed to transmit and receive data with an external device by using electromagnetic waves. At the time of data reception, an external electromagnetic wave is received by the receiving antenna 7 and is demodulated by the demodulation circuit 4 into data which is supplied to the CPU 1. The data is processed in the CPU 1 and is stored in the RAM 2b if necessary. At the time of data transmission, data is output from the CPU 1 to the modulation circuit 3 to modulate a carrier wave in this circuit, and an electromagnetic wave thereby formed is transmitted through the transmitting antenna 6.

To perform the desired operation of the CPU 1 on the basis of the program stored in the ROM 2a, it is necessary to initialize the CPU 1 formed on the chip 5 before driving the same. However, since the whole of the IC card is enclosed by the resin, the CPU 1 cannot be initialized after the resin molding. Conventionally, a reset terminal 10 connected to the CPU 1 is previously lead out from the IC chip 5. A reset signal is supplied to the CPU 1 through the reset terminal 10 to initialize the CPU 1 before resin molding. Thereafter, the whole of the IC card including the reset terminal 10 is molded.

The connection between the CPU 1 and the battery 8 is constantly maintained and the IC card therefore continues operating until the battery 8 is used up. For this reason, if an external disturbance exceeding the proof level of the IC chip 5 is applied to the IC card, there is a risk of a runaway of the CPU 1. It is possible that temperature, electromagnetic waves, light, radioactive rays, mechanical stress, static electricity and the like act as external disturbances. However, if a runaway of the CPU 1 takes place, there is no means to stop it since the CPU 1 cannot be initialized after the IC card has been resin molded, resulting in a disabled state of the IC card.

SUMMARY OF THE INVENTION

In view of this problem, an object of the present invention is to provide a non-contact IC card capable of initializing an incorporated data processing means such as a CPU even after being resin molded.

The present invention provides a non-contact IC card having: a data transmission/reception means for effecting data transmission and reception between the IC card and an external device in a non-contact manner; data processing means connected to the data transmission/reception means; reset signal receiving means for receiving a reset signal from the external device in a non-contact manner; and initializing means for initializing the data processing means on the basis of the reset signal received by the reset signal receiving means.

The data transmission/reception means and the reset signal receiving means may share an antenna, and a separation means for separating data to be processed by the data processing means and the reset signal from signals received by this antenna may be provided.

It is also possible to provide a means for cancelling the function of the initializing means during transmission of data from the data transmission/reception means to the external device.

DESCRIPTION OF THE PREFERRED EMBODIMENTS

Embodiments of the present invention will be described below with reference to the accompanying drawings.

Figure 1:
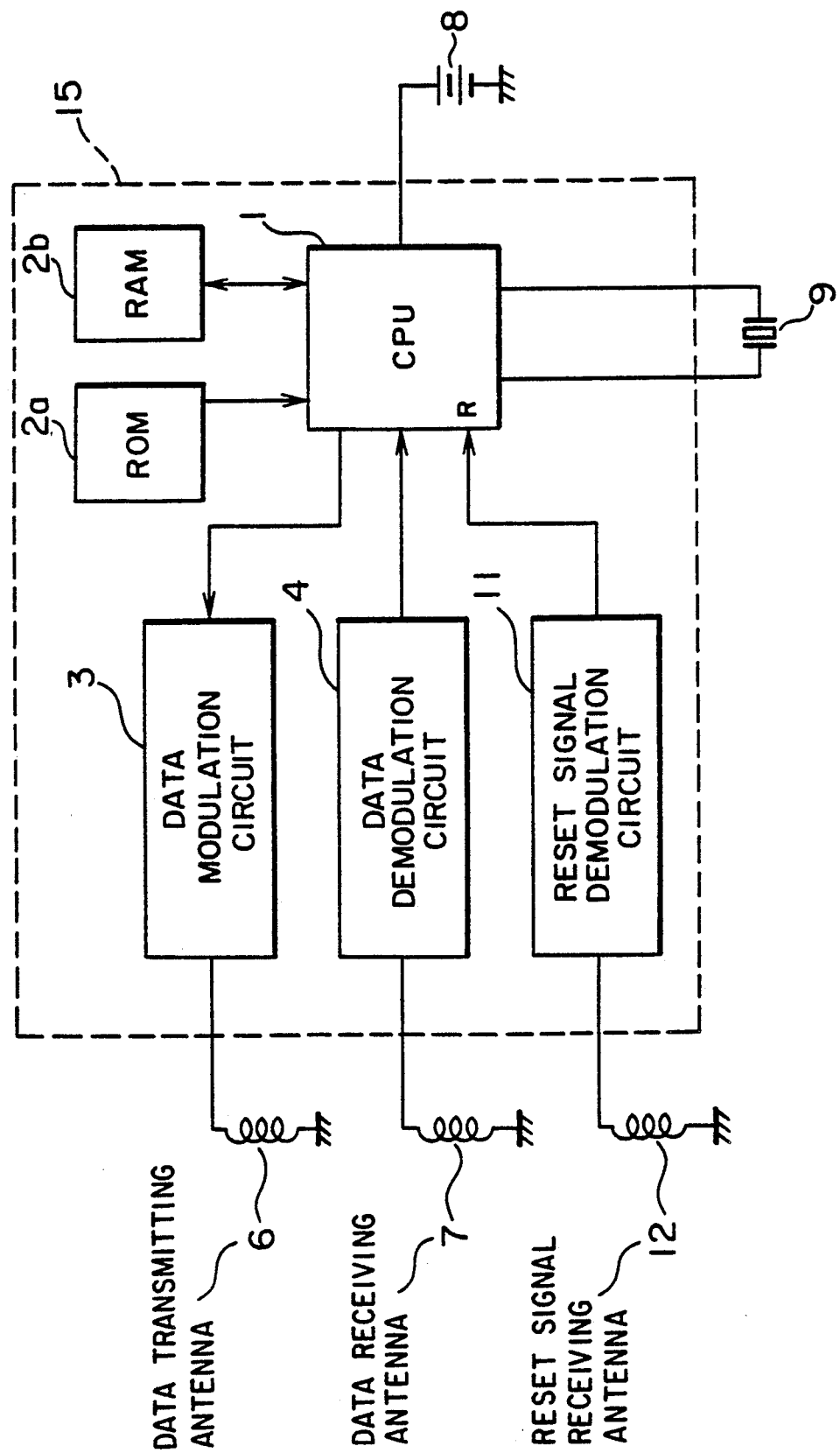
FIG. 1 is a block diagram of the structure of a non-contact IC card which represents an embodiment of the present invention.

Referring to FIG. 1, a non-contact IC card has an IC chip 15, a data transmitting antenna 6, a data receiving antenna 7, a reset signal receiving antenna 12, a battery 8 and an oscillator 9. On the IC chip 15 are formed a CPU 1 which serves as a data processing means. A ROM 2a, a RAM 2b, a data modulation circuit 3, a data demodulation circuit 4 and a reset signal demodulation circuit 11, each of which is connected to the CPU 1, are also formed on the IC chip 15. The reset signal demodulation circuit 11 is connected to a reset terminal R of the CPU 1. The data transmitting antenna 6 and the data receiving antenna 7 are connected to the modulation circuit 3 and the demodulation circuit 4, respectively, while the reset signal receiving antenna 12 is connected to the reset signal demodulation circuit 11. The battery 8 and the oscillator 9 are connected to the CPU 1.

The data modulation circuit 3, the data demodulation circuit 4, the data transmitting antenna 6 and the data receiving antenna 7 constitute a data transmission/reception means. The reset signal receiving antenna 12 serves as a reset signal receiving means, the reset demodulation circuit 11 serves as an initializing means, and the RAM 2b serves as a data storage means. The whole of the IC card is molded with a resin or the like to improve the resistance thereof to environmental influences.

Operation of this embodiment will be described below. The CPU 1 is supplied with a power source voltage from the battery 8 and is also supplied with a clock signal from the oscillator 9. A reset signal in the form of an electromagnetic wave is applied from an external device (not shown) to this IC card and received by the reset signal receiving antenna 12. The reset signal is demodulated in the reset signal demodulation circuit 11 and is then supplied to the reset terminal R of the CPU 1. The CPU 1 is thereby initialized to be operable. At the time of data receiving, an electromagnetic wave from the unillustrated external device is received by the receiving antenna 7 and is demodulated by the demodulation circuit 4 into data which is supplied to the CPU 1. The CPU 1 performs data processing on the basis of a program previously stored in the ROM 2a, and the data is stored in the RAM 2b if necessary. At the time of data transmission, data is output from the CPU 1 to the modulation circuit 3 to modulate a carrier wave in this circuit, and an electromagnetic wave thereby formed is transmitted to the outside through the transmitting antenna 6.

Each time the IC card is used, the CPU 1 can be initialized as desired by supplying the reset signal in the form of an electromagnetic wave to the IC card before data transmission or reception. In consequence, even if a runaway condition of the CPU 1 occurs due to an external disturbance, it is possible to restore the desired functions of the IC card by initializing the CPU 1.

Because data and the reset signal are transmitted with electromagnetic wave carriers, it is necessary to distinguish between the electromagnetic wave carrying data and the electromagnetic wave carrying the reset signal. These two electromagnetic waves are distinguished on the basis of a difference of the frequencies of the electromagnetic waves or on the basis of a difference of the magnitudes of the waves.

Figure 2:
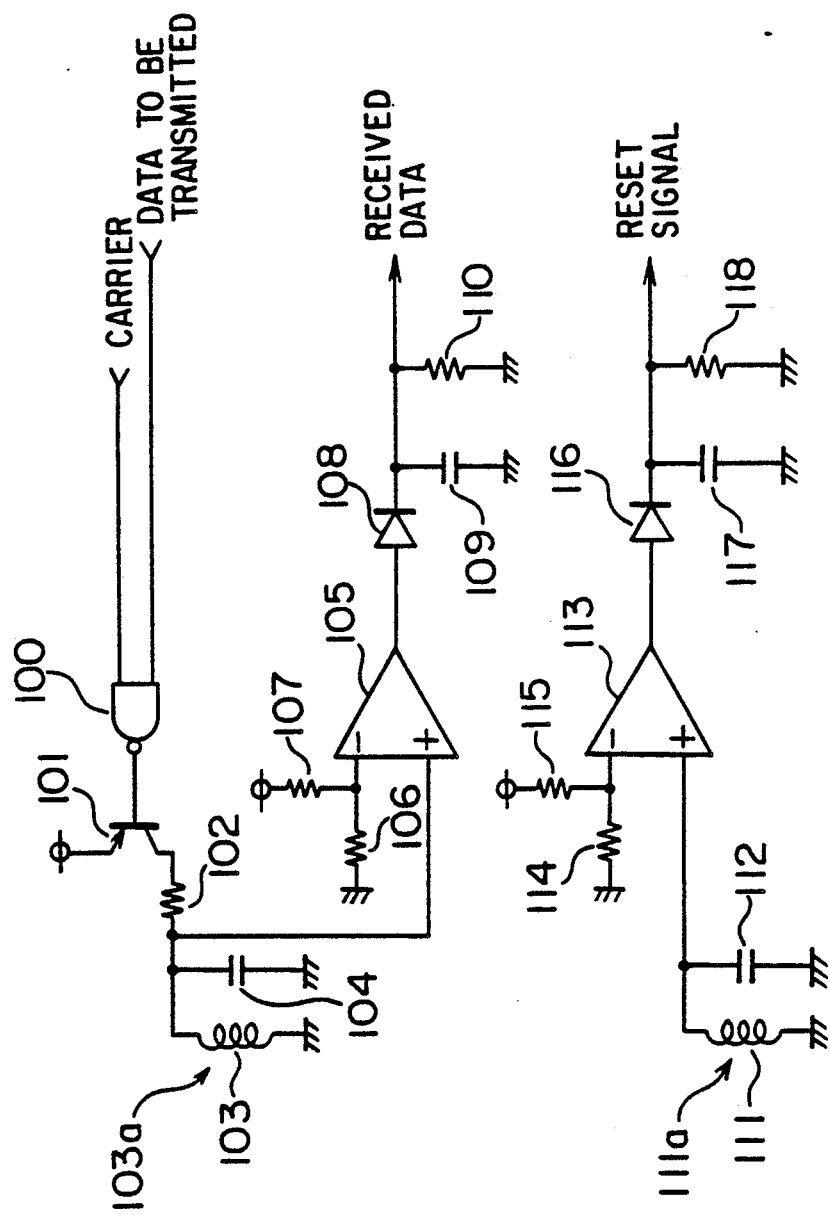
FIG. 2 is a circuit diagram of portions of a second embodiment of the invention.

FIG. 2 shows a circuit diagram of portions of a second embodiment of the present invention wherein electromagnetic waves carrying data and the reset signal have different frequencies $f_1$ and $f_2$, respectively. In this embodiment, the frequency $f_1$ of an electromagnetic wave for data transmission and the frequency $f_1$ of an electromagnetic wave for data reception are equalized to enable common use of an antenna 103 for data transmission and data reception. A capacitor 104 is connected to the antenna 103. The antenna 103 and the capacitor 104 form a first resonance circuit 103a having a resonance frequency equal to the frequency $f_1$ of the carrier for data transmission or reception. A gate circuit 100 is connected to the antenna 103 via a resistor 102 and a transistor 101. The gate circuit 100 is supplied with data to be transmitted and the carrier from the CPU 1. A first input terminal of a comparator 105 for determining whether or not received data exists is connected to the antenna 103. Resistors 106 and 107 for determining a reference voltage for the comparator 105 are connected to a second input terminal of the comparator 105. The output terminal of the comparator 105 is connected to the CPU 1 via a diode 108. A capacitor 109 and a discharge resistor 110 are connected to the output terminal of the diode 108.

This IC card has a reset signal receiving antenna 111 provided separately from the data transmission/reception antenna 103. The antenna 111 and a capacitor 112 connected to the antenna 111 form a second resonance circuit 111a having resonance frequency equal to the frequency $f_2$ of the carrier for the reset signal. A first input terminal of a comparator 113 for determining whether or not the reset signal exists is connected to the antenna 111. Resistors 114 and 115 for determining a reference voltage for the comparator 113 are connected to a second input terminal of the comparator 113. The output terminal of the comparator 113 is connected to the CPU 1 via a diode 116. A capacitor 117 and a discharge resistor 118 are connected to the output terminal of the diode 116.

If an electromagnetic wave having frequency $f_1$ and carrying data is introduced from outside into the IC card, it is received by the first resonance circuit 103a and is supplied to the comparator 105. Data reception is detected by the comparator 105, and a high level signal is supplied from the comparator 105 to the CPU 1 via the diode 108. At the time of data transmission, data to be transmitted and the carrier are supplied from the CPU 1 to the gate circuit 100. The carrier is modulated by the data in the gate circuit 100 and is thereafter transmitted through the antenna 103. The carrier is generated on the basis of an oscillation signal supplied from the oscillator 9 connected to the CPU 1.

If an electromagnetic wave having frequency $f_2$ and carrying the reset signal is introduced from the outside into the IC card, it is received by the second resonance circuit 111a, and a voltage generated in this resonance circuit 111a is supplied to the comparator 113. In the comparator 113, this voltage is compared with the reference voltage determined by the resistors 114 and 115. In this case, it is thereby determined that an electromagnetic wave carrying the reset signal has been received, and the output level of the comparator 113 becomes high. The capacitor 117 is thereby charged through the diode 116 so that the reset signal is supplied at a high level to the CPU 1.

During the time when no electromagnetic wave carrying the reset signal and having frequency $f_2$ is transmitted from outside to the IC card, no voltage is generated in the second resonance circuit 111a, and the output level of the comparator 113 is maintained at a low level so that any charge accumulated in the capacitor 117 is discharged through the resistor 118. Therefore, there is no possibility that a high level reset signal will be input into the CPU 1 until the IC card again receives an electromagnetic wave having frequency $f_2$.

Figure 3:
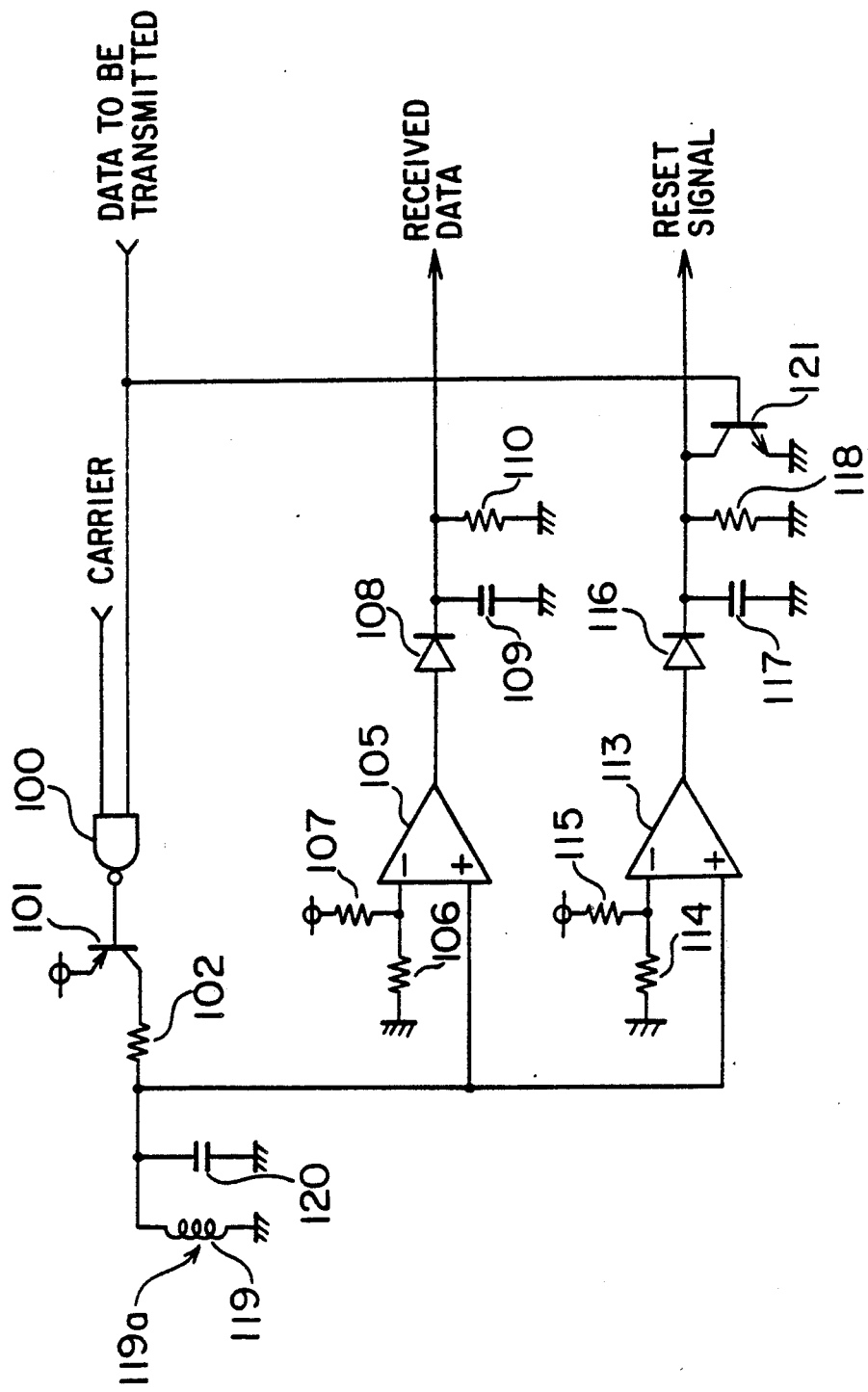
FIG. 3 is a circuit diagram of portions of a third embodiment of the invention.
Figure 4:
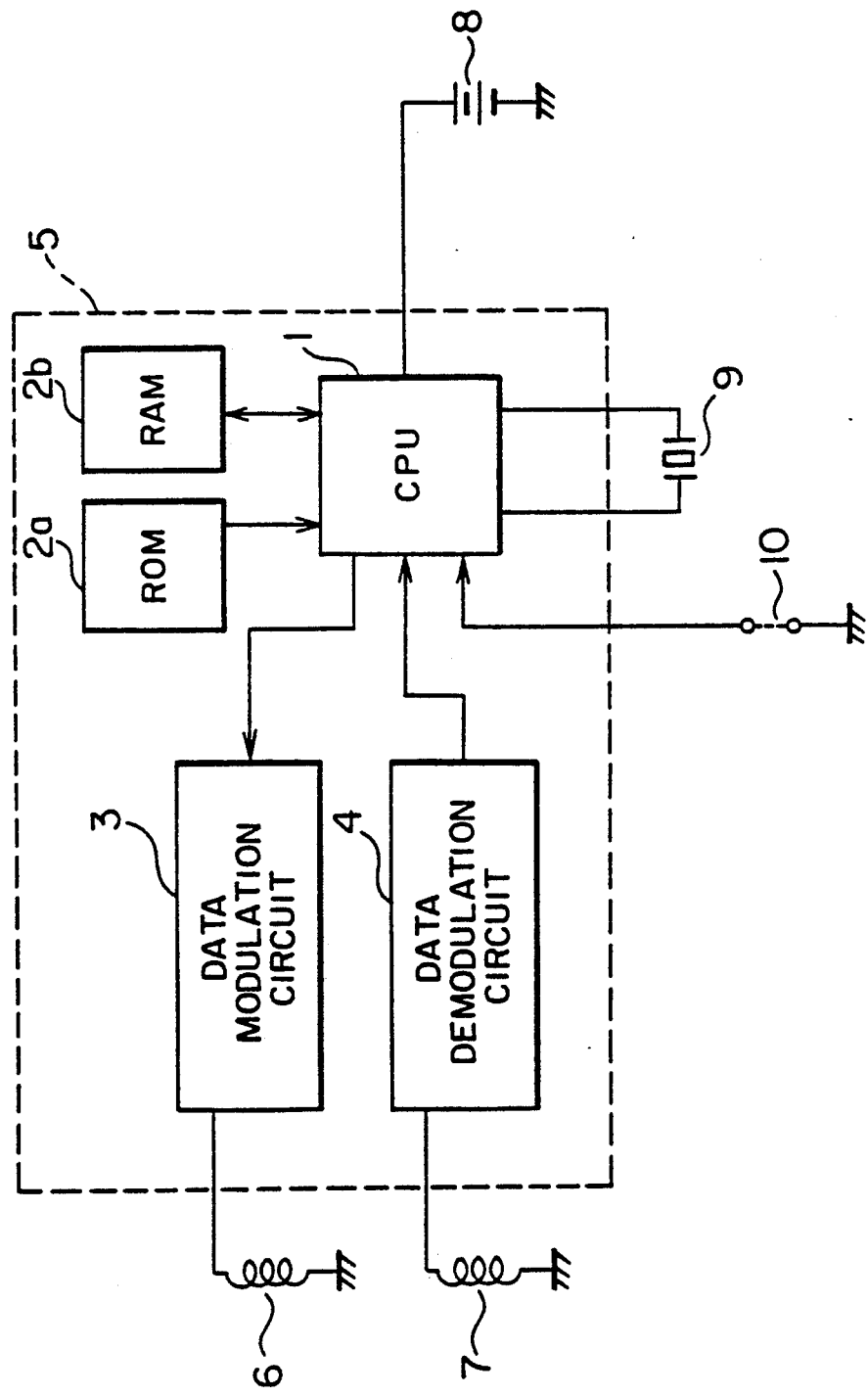
FIG. 4 is a block diagram of a conventional non-contact IC card.

FIG. 3 shows a circuit diagram of portions of a third embodiment of the present invention wherein the magnitude $M_2$ of an electromagnetic wave carrying the reset signal is higher than the magnitude $M_1$ of an electromagnetic wave carrying data, thereby enabling these electromagnetic waves to be distinguished. This embodiment is constructed on the basis of the arrangement of the second embodiment shown in FIG. 2 in such a manner that a resonance circuit 119a for both data transmission/reception and reset signal receiving is provided in place of the two resonance circuits 103a and 111a of the second embodiment, and that a transistor 121 is further connected between the ground and the output terminal of the diode 116. In this embodiment, the electromagnetic wave for data transmission/ reception and the electromagnetic wave carrying the reset signal have the same frequency $f_3$, and the resonance circuit 119a has a resonance frequency equal to the frequency $f_3$. The resonance circuit 119a is formed by an antenna 119 and a capacitor 120 connected to the antenna 119, and is connected to the comparators 105 and 113 and to the resistor 102. The transistor 121 provided between the output terminal of the diode 116 and the ground serves as a cancelling means, and the gate of the transistor 121 is connected to the transmission data input terminal of the gate circuit 100. The values of the resistors 106, 107, 114 and 115 are set so that the relationship between reference voltage $V_1$ of the comparator 105 for detecting the presence of received data, reference voltage $V_2$ of the comparator 113 for detecting the presence of the reset signal, voltage $V_3$ generated in the resonance circuit 119a when the electromagnetic wave of magnitude $M_1$ is received and voltage $V_4$ generated in the resonance circuit 119a when the electromagnetic wave of magnitude $M_2$ is received is expressed as $V_1 < V_3 < V_2 < V_4$. In this embodiment, the comparators 105 and 113 and the resistors 106, 107, 114 and 115 constitute a separation means.

If an electromagnetic wave carrying data and having magnitude $M_1$ is introduced from outside into the IC card, it is received by the resonance circuit 119a, and voltage $V_3$ is generated therein. Because voltage $V_3$ is higher than reference voltage $V_1$ of the comparator 105, the comparator 105 detects the presence of received data and supplies the received data to the CPU 1 via the diode 108. At this time, voltage $V_3$ generated in the resonance circuit 119a is also supplied to the comparator 113, but the output level of the comparator 113 does not become high since the comparator 113 has reference voltage $V_2$ higher than the generated voltage $V_3$. As a result, no reset signal is output.

If an electromagnetic wave carrying the reset signal and having magnitude $M_2$ is introduced from outside into the IC card, it is received by the resonance circuit 119a and voltage $V_4$ is generated therein. Because voltage $V_4$ is higher than reference voltage $V_2$ of the comparator 113, the comparator 113 detects the presence of the reset signal and supplies the reset signal to the CPU 1 via the diode 116, thereby initializing the CPU 1.

At the time of data transmission, the voltage corresponding to data to be transmitted is applied to the resonance circuit 119a via the gate circuit 100, the transistor 101 and the resistor 102, but this voltage is also supplied from the resistor 102 to the first input terminal of the comparator 113. Therefore, there is a risk of the output level of the comparator 113 becoming high even though the reset signal is not supplied. However, since the data to be transmitted is also supplied to the gate of the transistor 121 as well as to the gate circuit 100, the transistor 121 is made conductive by the data to be transmitted. Any charge accumulated in the capacitor 117 is discharged through the transistor 121, thereby preventing the high-level reset signal from being supplied to the CPU 1 in error during data transmission.

This third embodiment is capable of data transmission/reception and reset signal receiving with only one antenna 119 and is therefore specifically suitable for IC cards that need to be reduced in overall size by incorporating smaller parts.

What is claimed is:

1. A non-contact IC card comprising:
   data transmission/reception means for data transmission and data reception between an IC card and an external device via an electromagnetic carrier wave having a first frequency, without direct contact between the IC card and external device;
   data processing means connected to said data transmission/reception means for processing data received from the external device;
   reset signal detecting means for detecting an electromagnetic wave having a second frequency different from the first frequency transmitted as a reset signal from the external device to the IC card without direct contact between the IC card and external device; and
   initializing means for initializing said data processing means in response to the detection of a reset signal by said reset signal detecting means.

2. An IC card according to claim 1 wherien said data transmission/reception means includes a common data antenna for transmission and reception of the electromagnetic carrier wave having a first frequency.

3. An IC card according to claim 1 wherein said reset signal detecting means includes a reset signal receiving antenna for receiving the electromagnetic wave having a second frequency.

4. An IC card according to claim 3 wherein said initializing means includes a demodulation circuit connected to said reset signal receiving antenna.

5. An IC card according to claim 4 wherien said data processing means includes a reset terminal for initialization connected to said demodulation circuit.

6. An IC card according to claim 1, comprising data storage means connected to said data processing means for storing data.

7. A non-contact IC card comprising:
   data transmission/reception means for data transmission and data reception between an IC card and an external device via a first electromagnetic carrier wave having a first frequency and a first magnitude, without direct contact between the IC card and external device;
   data processing means connected to said data transmission reception means for processing data received from the external device;
   reset signal detecting means for detecting an electromagnetic wave of the first frequency and having a second magnitude greater than the first magnitude transmitted from the extrnal device to the IC card without direct contact between the IC card and external device, said data transmission/reception means and reset signal receiving means including threshold means for discriminating between the first and second magnitudes and for generating a data signal when a first threshold is exceeded and for generating a reset signal when a second threshold is exceeded; and
   initializing means for initializing said data processing means in response to the generating of a reset signal by said reset signal detecting means.

8. An IC card according to claim 7 comprising means for disabling said initializing means during transmission of data from said data transmission/reception emans to the external device.

9. An IC card according to claim 7 comprising data storage means connected to said data processing means for storing data.

* * * * *

UNITED STATES PATENT AND TRADEMARK OFFICE
CERTIFICATE OF CORRECTION

PATENT NO. : 5,068,521

DATED : November 26, 1991

INVENTOR(S) : Atsuo Yamaguchi

It is certified that error appears in the above-identified patent and that said Letters Patent is hereby corrected as shown below:

Item No. [57], Abstract, line 1, delete "-" (second occurrence);
                          line 6, after "device" insert --;--.

Column 6, line 13, change "wrerien" to --wherein--;
line 24, change "wherien" to --wherein--.
        line 27, delete ",";
        lines 37-38, change "transmission reception" to
                --transmission/reception--;
        line 43, change "extrnal" to --external--;
        line 53, chagne "generating" to --generation--;
        line 57, change "emans" to --means--.

Signed and Sealed this

Ninth Day of March, 1993

*Attest:*

STEPHEN G. KUNIN

*Attesting Officer*      *Acting Commissioner of Patents and Trademarks*